US007941116B2

(12) United States Patent
Man et al.

(10) Patent No.: US 7,941,116 B2
(45) Date of Patent: May 10, 2011

(54) MOBILE WIRELESS COMMUNICATIONS DEVICE ANTENNA ASSEMBLY WITH FLOATING DIRECTOR ELEMENTS ON FLEXIBLE SUBSTRATE AND RELATED METHODS

(75) Inventors: Ying Tong Man, Waterloo (CA); Yihong Qi, St. Agatha (CA); Adrian Cooke, Kitchener (CA); Krystyna Bandurska, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 727 days.

(21) Appl. No.: 11/947,178

(22) Filed: Nov. 29, 2007

(65) Prior Publication Data

US 2009/0143040 A1 Jun. 4, 2009

(51) Int. Cl.
*H04B 1/40* (2006.01)
*H01Q 1/38* (2006.01)

(52) U.S. Cl. ............... 455/269; 455/575.1; 343/700 MS

(58) Field of Classification Search .................... 455/26, 455/575.19, 575.1, 269, 272, 274; 343/866, 343/702, 748, 895, 700 MS
See application file for complete search history.

(56) References Cited

U.S. PATENT DOCUMENTS 6,069,586 A 5/2000 Karlsson et al. ....... 343/700 MS
6,642,893 B1 * 11/2003 Hebron et al. ................ 343/702
6,765,536 B2 7/2004 Phillips et al. ................ 373/702
6,791,500 B2 9/2004 Qi et al. ........................ 343/702
7,119,743 B2 * 10/2006 Iguchi et al. ........... 343/700 MS
7,119,748 B2 * 10/2006 Autti ............................. 343/702
7,132,992 B2 * 11/2006 Mori ............................. 343/770
7,224,321 B2 5/2007 Chiang et al. ................. 343/833
7,728,785 B2 * 6/2010 Ozden ........................... 343/866
2004/0080457 A1 * 4/2004 Guo et al. .............. 343/700 MS
2004/0137950 A1 * 7/2004 Bolin et al. ................ 455/562.1
2007/0164910 A1 7/2007 Qi et al. ........................ 343/702
2008/0143606 A1 * 6/2008 Ng et al. ................ 343/700 MS

FOREIGN PATENT DOCUMENTS

CA 2626589 5/2007
CA 2596907 11/2007
WO WO200001028 1/2000
WO 02/05384 1/2002
WO 2004/021511 3/2004
WO 2004/077610 9/2004
WO WO2007051295 5/2007

* cited by examiner

*Primary Examiner* — Blane J Jackson
(74) *Attorney, Agent, or Firm* — Allen, Dyer, Doppelt, Milbrath & Gilchrist, P.A.

(57) ABSTRACT

A mobile wireless communications device may include a portable housing, a circuit board carried by the portable housing and comprising a ground plane, and wireless communications circuitry carried by the circuit board. The device may also include an antenna assembly carried by the housing. The antenna assembly may include a flexible substrate, an electrically conductive antenna element on the flexible substrate and connected to the wireless communications circuitry and the ground plane, and at least one pair of floating, electrically conductive director elements on opposite sides of the flexible substrate for directing a beam pattern of the antenna element.

13 Claims, 6 Drawing Sheets

MOBILE WIRELESS COMMUNICATIONS DEVICE ANTENNA ASSEMBLY WITH FLOATING DIRECTOR ELEMENTS ON FLEXIBLE SUBSTRATE AND RELATED METHODS

FIELD OF THE INVENTION

The present invention relates to the field of communications devices, and, more particularly, to mobile wireless communications devices and antennas therefor and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing antennas that provide desired operating characteristics within the relatively limited amount of space available for the antenna.

One approach for reducing phone size is to use flip phones having top and bottom housings connected with a hinge. The housings may be closed when the phone is not in use so that it is more compact and easier for a user to carry. One exemplary antenna system for a flip style cellular phone is described in U.S. Pat. No. 6,765,536. In particular, the antenna system includes an external antenna element carried on the top of the lower housing, and a parasitic element carried by the top housing so that when the phone is flipped open the parasitic element is in close proximity to the antenna element. A tuning circuit carried by the lower housing is electrically coupled to the parasitic element. The tuning circuit is variable to adjust the parasitic load on the antenna element to provide variable operating frequencies and bandwidths for the phone.

External cell phone antennas are advantageous in that they are spaced apart from the user's head, which makes it easier for phone manufacturers to comply with applicable specific absorption rate (SAR) requirements, for example. This is because the farther the radiating element of the cell phone antenna system is from the user, the less intense the radiation exposure to the user. Yet, many users prefer internal antennas over external antennas, as external antennas are prone to catch on objects and become damaged, for example. Yet, with the ever increasing trend towards smaller cell phone sizes, for a relatively small phone having an internal antenna, this may place the antenna in relatively close proximity to the user's ear, which may make complying with applicable SAR and/or hearing aid compatibility (HAC) requirements potentially difficult for manufacturers.

One exemplary mobile phone configuration that attempts to address radiation concerns from an internal antenna is set forth in PCT Publication No. WO/2004/021511 A2. The device includes a casing including a first in-built driven antenna element extending a length along a longest side of the casing. Either the portable communication device or the case includes at least one passive beam directive element distanced from and generally extending along at least most of the same length as the first in-built driven antenna element. Because of this, electromagnetic radiation generated by the first in-built driven antenna element is enhanced in a direction away from a side of the casing intended to be facing a user.

Despite the existence of such configurations, further improvements may be desirable in certain applications, particularly where the form factor of the device housing does not provide adequate space for such arrangements.

DETAILED DESCRIPTION OF THE PREFERRED EMBODIMENTS

Figure 1:
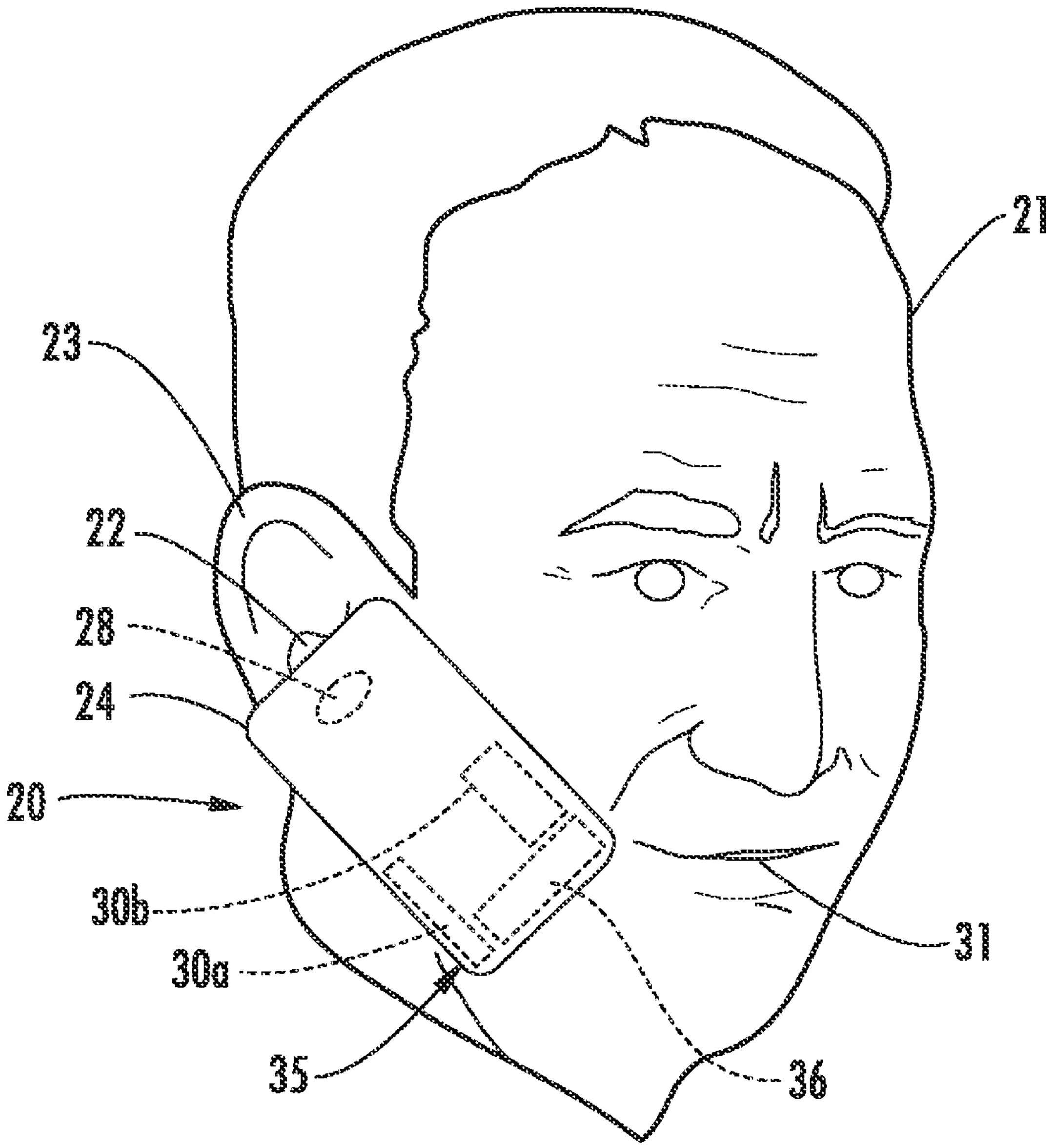
FIG. 1 is a perspective view of a mobile wireless communications device in accordance with one aspect adjacent a user's head.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer t o like elements throughout.

Generally speaking, a mobile wireless communications device is disclosed herein which may include a portable housing, a circuit board carried by the portable housing and comprising a ground plane, and wireless communications circuitry carried by the circuit board. Furthermore, the device may also include an antenna assembly carried by the housing. The antenna assembly may include a flexible substrate, an electrically conductive antenna element on the flexible substrate and connected to the wireless communications circuitry and the ground plane, and at least one pair of floating, electrically conductive director elements on opposite sides of the flexible substrate for directing a beam pattern of the antenna element.

More particularly, the floating, electrically conductive director elements may be generally parallel to one another. The flexible substrate may include a wrap-around portion adjacent a bottom of the housing. Moreover, portions of the electrically conductive antenna element may be on the wrap-around portion.

In addition, the electrically conductive antenna element may include at least one loop portion. More specifically, the electrically conductive antenna element may have a generally rectangular shape with at least one slotted opening therein defining the at least one loop portion. Also, the electrically conductive antenna element may further includes a first feed point for the wireless communications circuitry and a second feed point for the ground plane.

The floating, electrically conductive director elements may have a generally elongate shape extending vertically outwardly from the electrically conductive antenna element. Further, the portable housing may have a top and bottom, and the floating, electrically conductive director elements may extend from the bottom of the portable housing toward the top. At least one of the floating, electrically conductive director elements may have a cut-out therein.

A related antenna assembly, such as the one described briefly above, and a related method for making a mobile wireless communications device are also provided. The method may include positioning wireless communications circuitry on a circuit board comprising a ground plane, and mounting an antenna assembly on a portable housing, such as the one described briefly above. The method may further include connecting the circuit board to the portable housing so that the electrically conductive antenna element is connected to the wireless communication circuitry and the ground plane.

Referring initially to FIGS. 1 through 4, a mobile wireless communications device 20, such as a cellular telephone, is for a user 21. In some applications, the user 21 may be wearing an electronic hearing aid 22 in an ear 23 of the user. In particular, the device 20 may advantageously provide desired hearing aid compatibility (HAC) for users with hearing aids in some implementations, as will be discussed further below, but need not be used with hearing aids in all embodiments.

The device 20 illustratively includes a portable housing 24 and an audio output transducer 28 (e.g., a speaker) carried by the housing and accessible to the electronic hearing aid 22 of the user 21 adjacent the top of the housing as shown. An audio input transducer 32 (e.g., microphone) is also carried by the housing 24 and accessible to a mouth 31 of the user 21 adjacent the bottom of the housing. Although described herein with reference to a cellular device, it should be noted that the present disclosure may be applicable to other wireless communications devices such as wireless LAN devices, etc.

The cellular telephone 20 further illustratively includes a printed circuit board (PCB) 37 carried by the housing 24 and wireless communications circuitry 38 (e.g., cellular transceiver, etc.) carried by the PCB. In the illustrated embodiment, the wireless communications circuitry 38 is carried on the back on the PCB 37, but in other embodiments it may be carried on the front side, for example. A ground plane 39 is illustratively carried on a front surface of the PCB 37, although the ground plane may be located elsewhere in other embodiments, as will be appreciated by those skilled in the art. The device 20 may further include other components carried by the housing 24 and/or PCB 37 such as a display, battery, keypad, processing circuitry, etc., as will be discussed further below.

Figure 2:
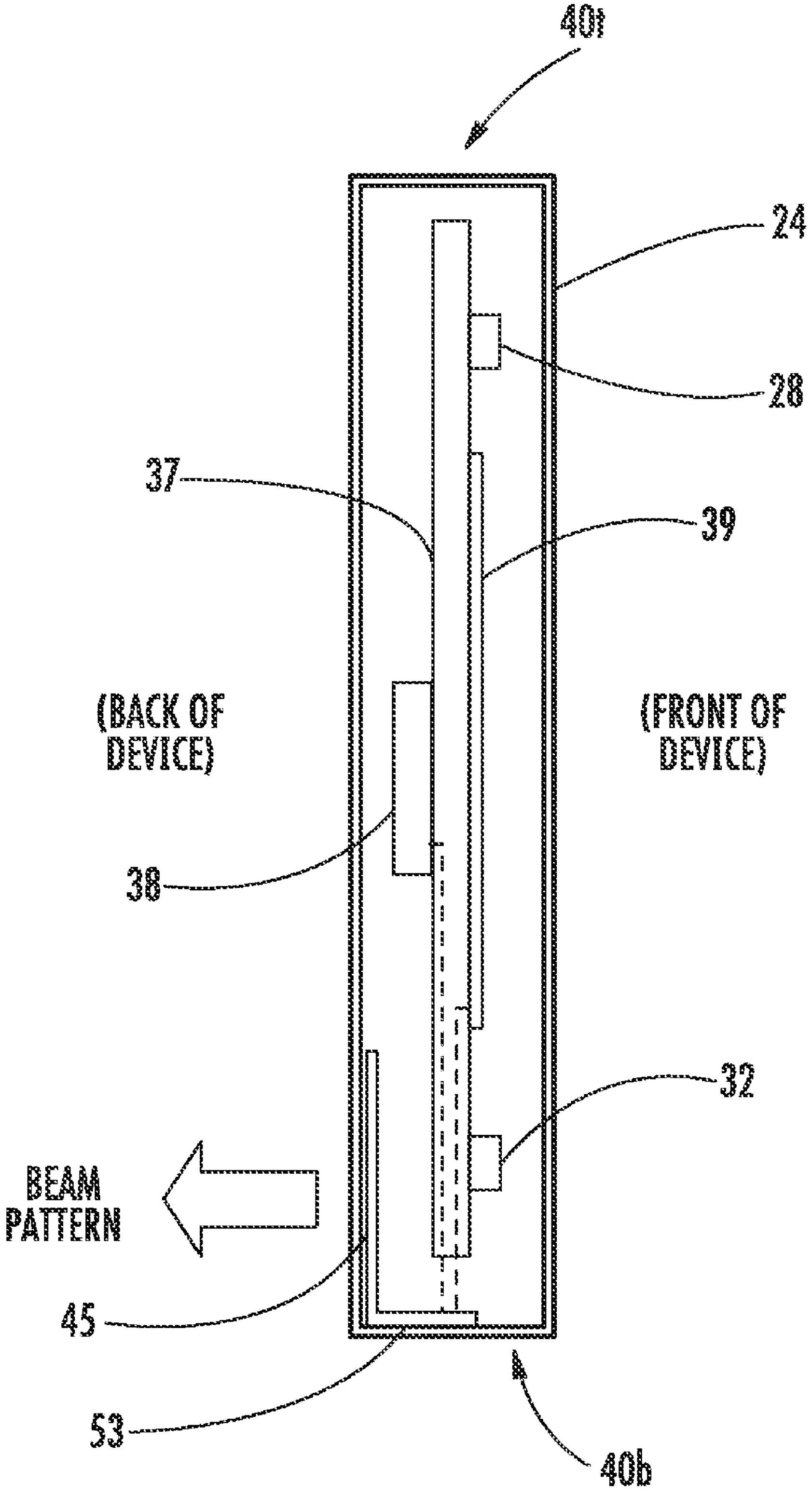
FIG. 2 is a side cutaway view of an embodiment of the mobile wireless communications device of FIG. 1.
Figure 3:
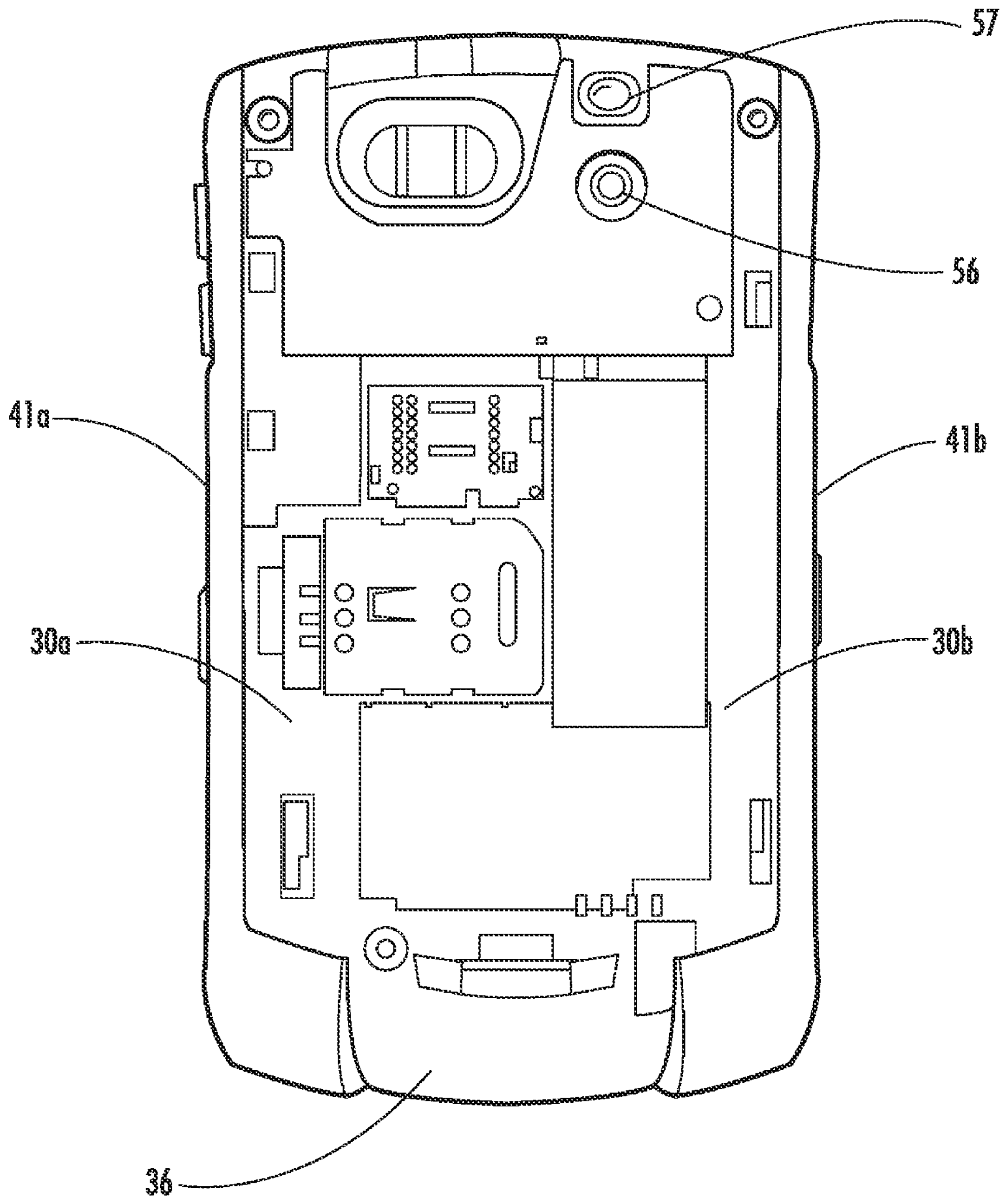
FIG. 3 is a rear view of an embodiment of the mobile wireless communications device of FIG. 1 with a battery cover removed.

The portable housing 24 has a top 40*t*, bottom 40*b* (FIG. 2) and left and right sides 41*a*, 41*b* (FIG. 3). The antenna assembly 35 is illustratively positioned adjacent the bottom 40*b* of the portable housing 24 and includes a flexible substrate 45, such as a semi-transparent dielectric ribbon, as well as an electrically conductive antenna element 36 on the flexible substrate and connected to the wireless communications circuitry 38 and the ground plane 39 (FIG. 2). By way of example, the conductive antenna element 36 may be a printed conductor which is advantageously printed on the flexible substrate 45, which in turn is attached to the portable housing 24 by a suitable adhesive, etc. Also, the antenna element 36 may be connected to the circuitry 38 and ground plane 39 by a flex conductor, for example, or other suitable connectors. In some embodiments, portions of the antenna element 36 may be on the flexible substrate 45, while other portions of the antenna element may be positioned elsewhere, as will be appreciated by those skilled in the art.

In the illustrated example, the antenna assembly 35 is secured to the housing 24 underneath where a battery cover (not shown) is attached to the back of the housing. That is, when the battery cover is connected to the housing 24, it covers the antenna assembly 35 so it is not visible to a user. However, it should be noted that other placements and/or approaches for securing the antenna assembly 35 to the housing may also be used. The structure of the antenna element 36 is discussed further below.

The antenna element 36 may take the form of one or more single or multi-feed point antenna elements (monopole, inverted F, etc.), for example, as will be appreciated by those skilled in the art. In the illustrated embodiment, the antenna element 36 is a multi-band inverted F antenna which advantageously covers GSM 850/900/1800/1900 bands, although other bands (e.g., UMTS 2100 MHz) may also be used by appropriate adjustment of electrical length, etc., as will be appreciated by those skilled in the art. The antenna element 36 overall has a generally rectangular shape with one or more slotted openings 48 therein defining a loop portion 47. In the illustrated embodiment there is a single loop portion 47, but in other embodiments there may be multiple slotted openings defining multiple loops, as seen in related co-pending application Ser. No. 11/863,324, which is assigned to the present Assignee and is hereby incorporated herein in its entirety by reference.

Figure 4:
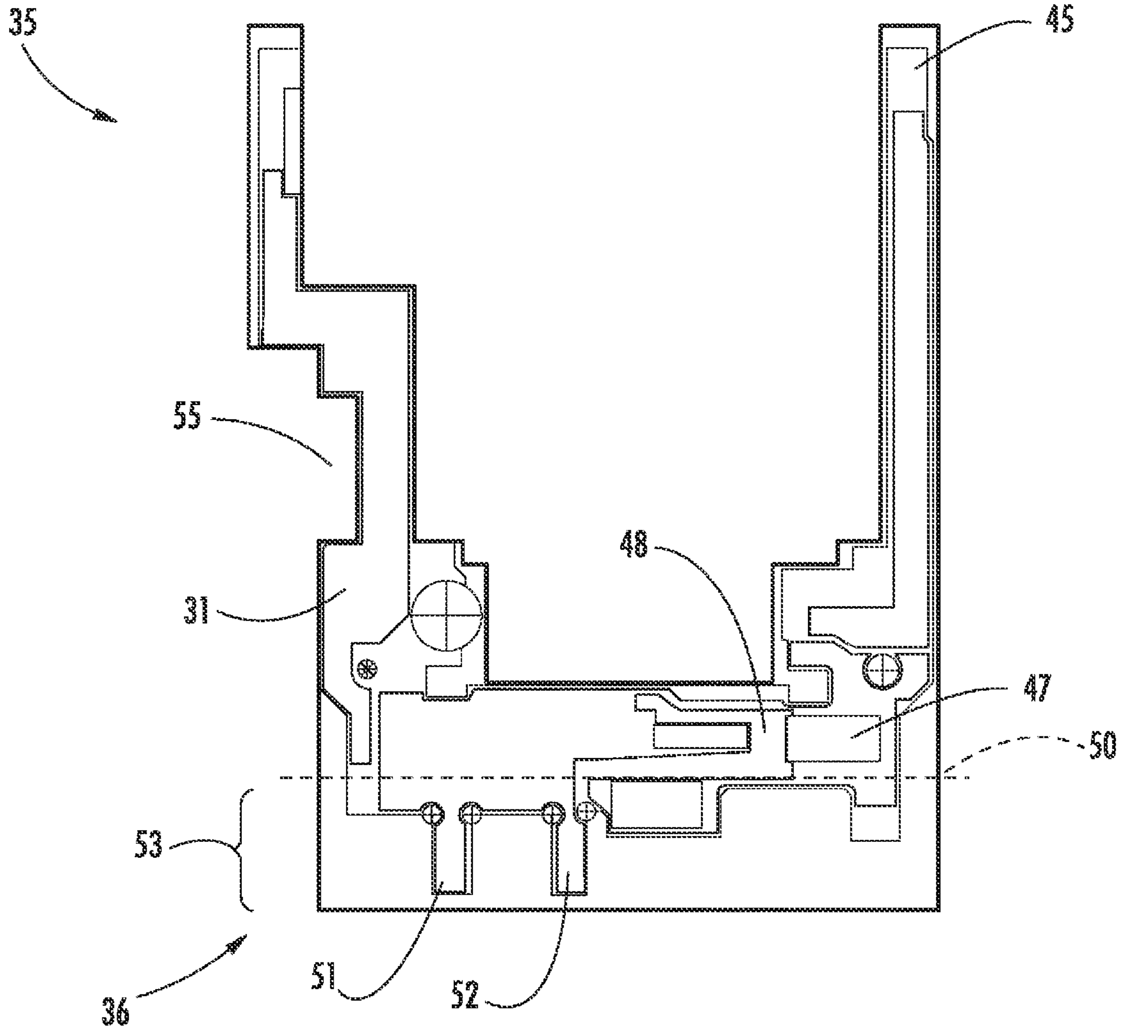
FIG. 4 is 2D plan view of an embodiment of the antenna assembly of the mobile wireless communications device of FIG. 1.
Figure 5:
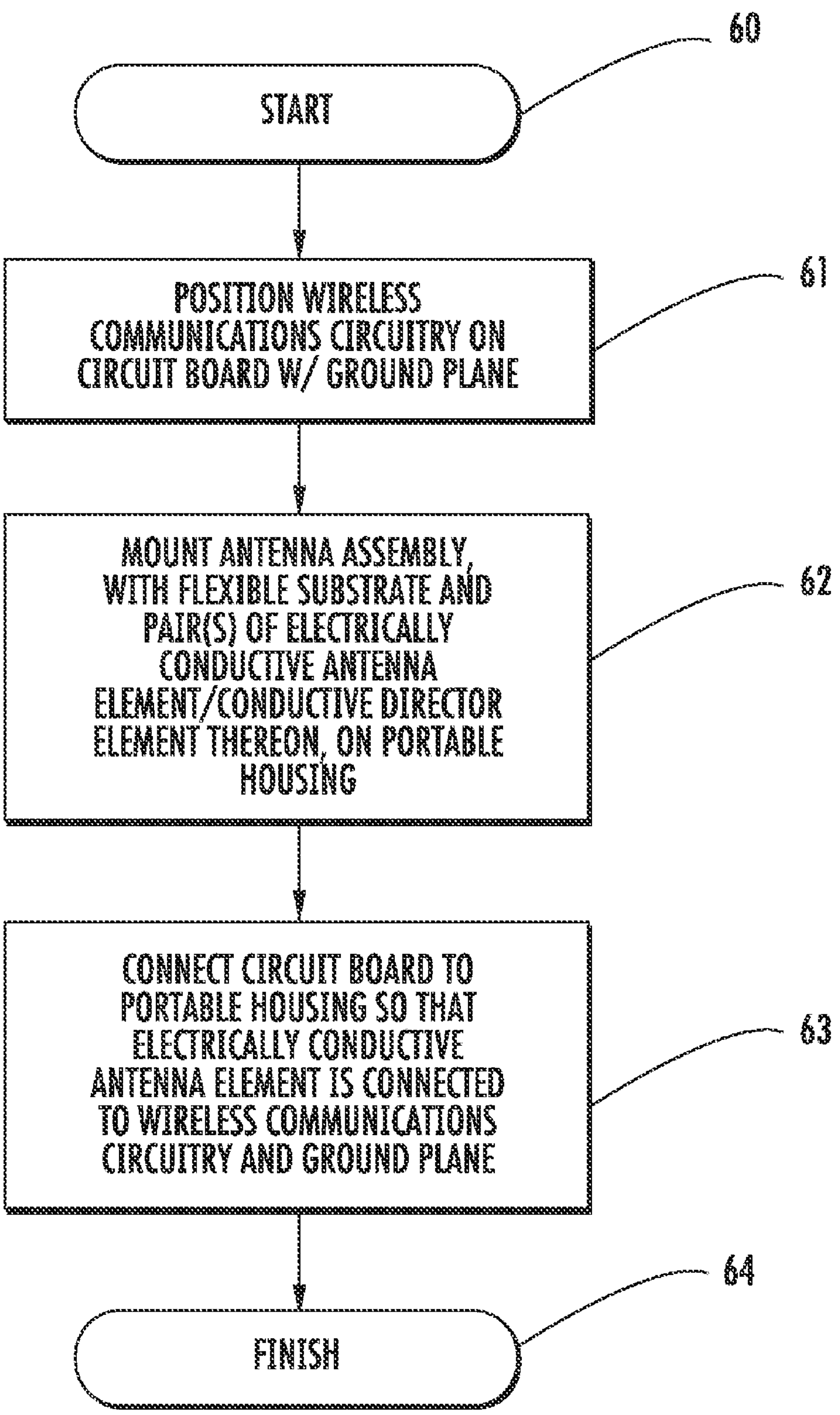
FIG. 5 is a flow diagram illustrating a method for making a mobile wireless communications device in accordance with one aspect.

The antenna element 36 further illustratively includes a first feed point 51 that is electrically connected to the wireless communications circuitry 38, and a second feed point 52 that is electrically connected to the ground plane 39. Both of the first and second feed points 51, 52 are coupled or connected to the loop portion 47, as seen in FIG. 4. In the exemplary embodiment, the flexible substrate 45 has a wrap-around portion 53, which is the portion below the dashed line 50 (FIG. 4). More particularly, the wrap-around portion 53 wraps around or underneath the bottom 40*b* of the portable housing 24. Portions of the antenna element 36, namely the first and second feed points 51, 52, and lower portions of the element, are on the wrap-around portion 53 as seen in the illustrated example, although other portions of the antenna element may also be included on the wrap-around portion (or no wrap-around portion used at all in some embodiments).

The folded, loop-back configuration of the loop 47 advantageously provides a relatively compact antenna design compared with an equivalent traditional monopole or inverted F antenna. This may advantageously provide a smaller footprint, which results in a greater surface integration area savings. By way of example, in the illustrated embodiment the antenna element 36 has a generally rectangular footprint of about 1.5 cm tall by 4 cm wide, although other sizes and dimensions may be used in different embodiments. The lengths and shapes of the loop portion 47 may advantageously be chosen to provide an effective electrical length of $\lambda/4$ of the respective operating frequencies of the antenna element 36, as will be appreciated by those skilled in the art.

In the present example, the antenna element 36 is positioned adjacent the bottom 40*b* of the PCB 37 and therefore the bottom of the housing 24 (i.e., adjacent where the input transducer 32 is). This advantageously helps reduce coupling to the electronic hearing aid 22 of the user 21 with respect to traditional top-mounted, internal cellular phone antennas. This is because the electronic hearing aid 22 of the user 21 is advantageously further separated from the antenna element 36 when the cellular telephone 20 is held adjacent the user's ear 23 than would otherwise be the case with a typical top-mounted, internal cellular telephone antenna, for example. Moreover, this antenna placement also helps space the antenna element 36 farther apart from the user's brain, which in turn helps to reduce the SAR of the device 20 again with respect to a traditional top-mounted, internal cellular phone antenna. However, it should be noted that a top-mounted or other antenna placement may be used in some embodiments.

Nonetheless, if the portable housing 24 has a relatively small form factor or footprint for user convenience, this means that the antenna 35 may still be positioned relatively close to the user's ear 23, thus potentially elevating the SAR or coupling to the hearing aid 22 to unacceptable levels. Moreover, close proximity of the antenna element 36 to a user's head may also cause interference with a typical cellular antenna radiation pattern, for example.

As such, the antenna assembly 35 further advantageously includes one or more pairs of floating, electrically conductive director elements 30*a*, 30*b* on the flexible substrate 45 for directing a beam pattern of the antenna element 36. More particularly, in the illustrated configuration the director elements 30*a*, 30*b* direct the beam pattern of the antenna element 36 away from the user, as seen in FIG. 2. This not only helps to prevent interference from blockage of the beam pattern by the user's head, but is also advantageously directs RF energy away from the user's head so that there is less coupling with the user's hearing aid 22 and/or potentially reduced device SAR, as will be appreciated by those skilled in the art. This may also advantageously help with head phantom TRP measurements, for example, as will be appreciated by those skilled in the art.

In the illustrated embodiment the director elements 30*a*, 30*b* have a generally rectangular shape with a lower end laterally adjacent the antenna element 36. The director element 30*a* has a cut-out 55 therein (FIG. 4). While such cut-outs may be used in the antenna elements 30*a*, 30*b* to accommodate holes, etc. in the portable housing 24, such cut-outs or narrowed portions may also serve to change the allowable effective length of the director element to lengths other than λ/4 of a given operating frequency (e.g., λ/2, etc.), as will be appreciated by those skilled in the art. This may advantageously provide enhanced flexibility in layout to accommodate different embodiments where different amounts of portable housing surface area 24 are available. The director element 30*a* also has loop-back or meander portions, which can further be used to circumvent holes, etc., in the housing 24 and/or change the effective length of the director element. The director element 30*b* generally resembles a backward "L" in the illustrated example, although other shapes are also possible.

More particularly, the director elements 30*a*, 30*b* illustratively have elongate shapes extending vertically outwardly from the antenna element 36, as seen in FIG. 4. That is, the director elements 30*a*, 30*b* respectively extend vertically along the left side 41*a* and right side 41*b* of the portable housing 24 from the bottom 40*b* thereof toward the top 40*t*, and are generally parallel to one another in this regard. However, in other embodiments the director elements 30*a*, 30*b* may advantageously be positioned elsewhere.

Generally speaking, it is desirable to match the director elements 30*a*, 30*b* to the operating frequencies of the antenna element 36. By way of example, one of the director elements 30*a*, 30*b* may be matched to the lower frequency bands (e.g., GSM 850/900), while the other is matched to the upper frequency bands (e.g., GSM 1800/1900), although other configurations are possible in different embodiments. In the illustrated example, the director elements 30*a*, 30*b* have overall lengths of about 4-6 cm, and widths varying from about 1 to 4 mm, although other dimensions are also possible in other dimensions.

In the illustrated example, the director elements 30*a*, 30*b* are not on the wrap-around portion 53 of the flexible substrate 45, although some portions of at least one of the director elements may be on the wrap-around portion in some embodiments. The flexible substrate 45 advantageously facilitates the placement of the antenna element 36 (or multiple elements in other embodiments) and director elements 30*a*, 30*b* during manufacturing, which may avoid the potential difficulty of printing conductive traces on portions of the housing 24, for example. Moreover, the flexible substrate 45 may be relatively easily patterned to fit numerous styles and/or sizes of housings 24. Furthermore, the flexible substrate 45 allows the antenna element 36 to be placed in locations other than on the PCB 37, so that the PCB surface area can be used for other elements. The flexible substrate 45 also provides for the relatively easy wrapping around the bottom 40*b*, etc., of the portable housing 24. This may therefore take advantage of potentially otherwise unused housing 24 surface area so that less of the back-side of the housing, which may need to be used for battery slots, camera lenses, etc., is required. A camera lens 56 and flash 57 are incorporated in the exemplary device 20 (FIG. 3), although these need not be included in all embodiments.

In the embodiment illustrated in FIG. 3, the director elements 30*a*, 30*b* and the antenna element 36 are covered with a cover layer, which advantageously helps protect them so that they are not damaged or altered such that performance is potentially degraded. By way of example, the cover layer may be a dielectric tape layer, etc. One may also advantageously conceal the director elements 30*a*, 30*b*, for example, by making the cover layer the same color as a color of the portable housing 24, as will be appreciated by those skilled in the art.

A related method for making a mobile wireless communications device 20 is now briefly described with reference to FIG. 6. Beginning at Block 60, the method illustratively includes positioning wireless communications circuitry 38 on a circuit board 37 having a ground plane 39 thereon, at Block 61, and mounting an antenna assembly 35, such as the one briefly described above, on a portable housing 24 (Block 62). The method may further include connecting the circuit board 37 to the portable housing 24 so that the electrically conductive antenna element 36 is connected to the wireless communications circuitry 38 and the ground plane 39, at Block 63, thus concluding the illustrated method (Block 64).

Exemplary components that may be used in the device 20 will now be described in the following example with reference to a wireless communications device 1000 shown in FIG. 6. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 6:
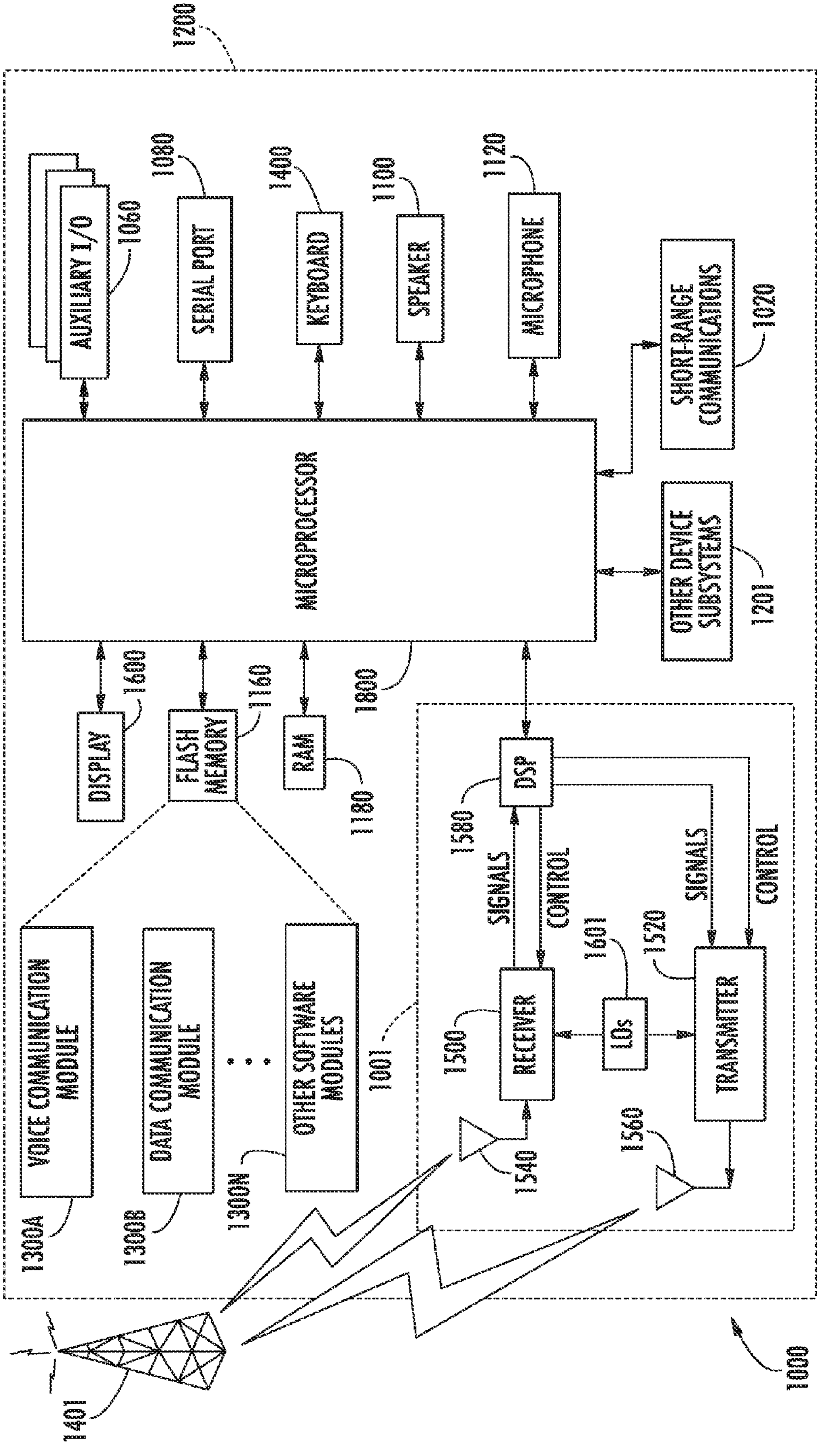
FIG. 6 is a schematic block diagram illustrating exemplary components that may be included in the wireless communications device of FIG. 1.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a portable housing having a top and bottom;
a circuit board carried by said portable housing and comprising a ground plane;
wireless communications circuitry carried by said circuit board; and
an antenna assembly carried by a surface of said housing and comprising
a flexible substrate including a wrap-around portion adjacent the bottom of said portable housing,
an electrically conductive antenna element on said flexible substrate and connected to said wireless communications circuitry and said ground plane, including portions of said electrically conductive antenna element being on said wrap-around portion adjacent the bottom of said portable housing, and
at least one pair of floating, electrically conductive director elements on opposite sides of said flexible substrate for directing a beam pattern of said antenna element and each having a generally elongate shape extending vertically outwardly away from said electrically conductive antenna element from the bottom of said portable housing toward the top, with a lower end laterally adjacent the antenna element.

2. The mobile wireless communications device of claim 1 wherein said floating, electrically conductive director elements are generally parallel to one another.

3. The mobile wireless communications device of claim 1 wherein said electrically conductive antenna element comprises at least one loop portion.

4. The mobile wireless communications device of claim 3 wherein said electrically conductive antenna element has a generally rectangular shape with at least one slotted opening therein defining the at least one loop portion.

5. The mobile wireless communications device of claim 1 wherein said electrically conductive antenna element further comprises a first feed point for said wireless communications circuitry and a second feed point for said ground plane.

6. The mobile wireless communications device of claim 1 wherein at least one of said floating, electrically conductive director elements has a cut-out therein.

7. An antenna assembly for a mobile wireless communications device comprising a portable housing having a top and bottom, a circuit board carried by the portable housing and having a ground plane thereon, and wireless communications circuitry carried by the circuit board, the antenna assembly comprising:
a flexible substrate including a wrap-around portion to position adjacent the bottom of said portable housing;
an electrically conductive antenna element on said flexible substrate and connected to said wireless communications circuitry and said ground plane, including portions of said electrically conductive antenna element being on said wrap-around portion to position adjacent the bottom of said portable housing; and
at least one pair of floating, electrically conductive director elements on opposite sides of said flexible substrate for directing a beam pattern of said antenna element, and each having a generally elongate shape extending vertically outwardly away from said electrically conductive antenna element from the bottom of the portable housing toward the top, with a lower end laterally adjacent the antenna element.

8. The antenna assembly of claim 7 wherein said floating, electrically conductive director elements are generally parallel.

9. The antenna assembly of claim 7 wherein said electrically conductive antenna element comprises at least one loop portion.

10. The antenna assembly of claim 9 wherein said electrically conductive antenna element has a generally rectangular shape with at least one slotted opening therein defining the loop portion.

11. A method for making a mobile wireless communications device comprising:
positioning wireless communications circuitry on a circuit board comprising a ground plane;
mounting an antenna assembly on a surface of a portable housing, the antenna assembly comprising
a flexible substrate including a wrap-around portion to position adjacent a bottom of said portable housing,
an electrically conductive antenna element on the flexible substrate and connected to the wireless communications circuitry and the ground plane, including portions of said electrically conductive antenna element being on said wrap-around portion adjacent the bottom of said portable housing, and
at least one pair of floating, electrically conductive director elements on opposite sides of the flexible substrate for directing a beam pattern of the antenna element, and each having a generally elongate shape extending vertically outwardly away from said electrically conductive antenna element from the bottom of said portable housing toward a top, with a lower end laterally adjacent the antenna element; and
connecting the circuit board to the portable housing so that the electrically conductive antenna element is connected to the wireless communication circuitry and the ground plane.

12. The method of claim 11 wherein the floating, electrically conductive director elements are generally parallel.

13. The method of claim 11 wherein the electrically conductive antenna element comprises at least one loop portion.

* * * * *